Apr. 17, 1923.

W. E. GRAY

LEMON SQUEEZER

Original Filed Nov. 13, 1920

1,452,270

Witnesses:
W. Schnellhardt
J. D. Stuwe

Inventor
William E. Gray
By Joshua R H Cocks.
His Attorney

Patented Apr. 17, 1923.

1,452,270

UNITED STATES PATENT OFFICE.

WILLIAM E. GRAY, OF CHICAGO, ILLINOIS.

LEMON SQUEEZER.

Original application filed November 13, 1920, Serial No. 423,770. Divided and this application filed September 24, 1921. Serial No. 503,053.

*To all whom it may concern:*

Be it known that I, WILLIAM E. GRAY, a citizen of the United States, and a resident of the city of Chicago, county of Cook, and State of Illinois, have invented certain new and useful Improvements in Lemon Squeezers, of which the following is a specification.

My invention relates to new and useful improvements in lemon squeezers, and has for its main object the provision of a lemon squeezer suitable for individual use at the table.

This application is a division of my prior application, Serial No. 423,770, filed November 13, 1920.

When a portion or slice of lemon or a similar citrous fruit is served with edibles at the table, it occasionally happens, while squeezing the juice on the edibles, that a spray of such juice finds its way onto the garments or into the face of someone of the diners.

It is this undesirable occurrence that I seek to avoid, and as a remedy, I have perfected this lemon squeezer, a separate one being adapted to be placed on the table for each diner.

Other objects will appear hereinafter.

The invention consists in the combinations and arrangements of parts hereinafter described and claimed.

Figure 1:
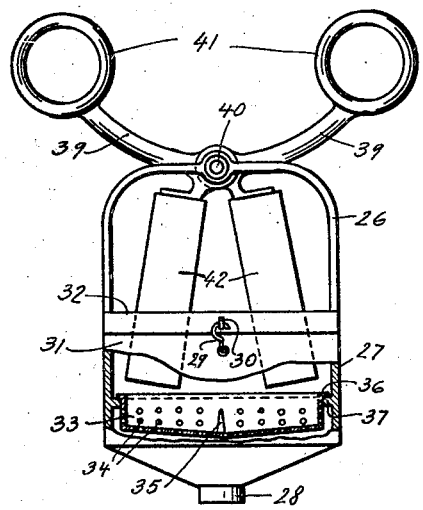
Figure 2:
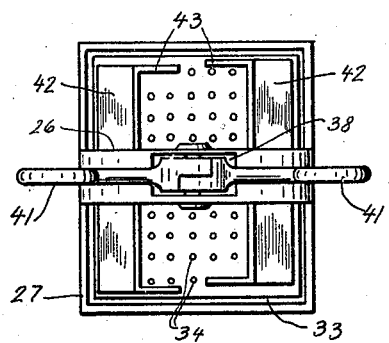

The invention will be best understood by reference to the accompanying drawings forming a part of this specification, and in which, Fig. 1 is a side elevation of the present form of invention, partly in section, and Fig. 2 is a plan view thereof.

The device illustrated comprises a housing or outer frame, including an upper bracket 26 and a rectangular shaped case 27, removably attached thereto, which case has an opening 28 in the depressed lower portion thereof. Suitable fastening means, as a hook 29 and eye 30, are provided on the collar 31 of the case 27 and the band 32 of the bracket 26, respectively. A rectangular cup or container 33 is supported in said case 27, having perforations 34 in the sides and bottom thereof. The container 33 is provided with a pin 35 at the center of the bottom to hold the citrous fruit in position, and with a laterally extending flange 36, which flange is supported on ribs 37 formed on the inner side walls of the case. An opening 38 is provided in the upper end of the bracket in which a pair of co-operating squeezers 39 is inserted and pivotally retained by the means of a pin 40. The upper end of each squeezer member 39 is supplied with an eye or finger engaging portion 41, and the lower end with a rectangular blade 42 containing rectangular flanges 43, which extend at right angles to the main blade, and are offset with respect to the opposing flanges on the cooperating squeezer blade.

In operation, a half lemon or portion of lemon, or of similar citrous fruit, is placed on the pin 35 in the container 33 with the cut portion downwards; the upper or bracket part 26 is then fastened onto the lower or case part 27 and the squeezers are operated by the engagement of the fingers in the eye portions. The device may be rested on a cup or glass while the juice is being squeezed out, or the device may be held over the edibles and the juice directly squeezed thereon. The blades have been arranged in scissors fashion to force the juice from the fruit portion downwardly into the container, avoiding any upward spray of the juice. The container with the pulp of the citrous fruit may then be taken out of the case, the pulp removed, and the entire device immediately and thoroughly washed.

It is thus found that I have provided a convenient and practical lemon squeezer adapted for direct individual use at the table, and which will obviate the unpleasant occurence above set forth.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the class described comprising a rectangular outer frame, a perforated container supported therein, an outlet in said frame exterior of said container, and a pair of rectangular squeezers mounted in scissors fashion on said frame.

2. A device of the class described comprising a rectangular outer frame, a perforated rectangular container detachably supported in said frame, and a pair of rectangular squeezer blades mounted in said frame above said container.

3. A device of the class described comprising a rectangular outer frame; a perforated rectangular container detachably supported in said frame, and a pair of rectangular squeezer blades provided with rectangular flanges pivotally mounted in said frame above said container.

4. A device of the class described comprising an upper bracket and a rectangular case detachably connected thereto, a rectangular container mounted in said case, and a pair of flanged squeezer blades mounted in said bracket.

5. A device of the class described comprising an upper bracket and a rectangular case connected thereto, a rectangular container detachably mounted in said case, and a pair of squeezer blades mounted in said bracket, each of said blades having flanges which are offset with respect to the flanges on the co-operating blade.

6. A device of the class described comprising an upper bracket and a rectangular case detachably connected thereto, a rectangular container removably supported in said case, and a pair of squeezers pivotally mounted in the bight of said bracket and provided with flanged blades operable in said case.

7. A device of the class described comprising an upper bracket and a rectangular case detachably connected thereto, a perforated rectangular container detachably mounted in said case, means for retaining fruit at the center of said container, and a pair of flanged squeezer blades pivotally mounted in said bracket and centered above said retaining means and container.

In testimony whereof I have signed my name to this specification in the presence of two subscribing witnesses:

WILLIAM E. GRAY.

Witnesses:
 JOSHUA R. H. POTTS,
 FREDA C. APPLETON.